May 30, 1944. V. WEBER 2,350,137
ADJUSTING MEANS FOR OVEN HEAT CONTROL
Filed Dec. 4, 1941 2 Sheets-Sheet 1
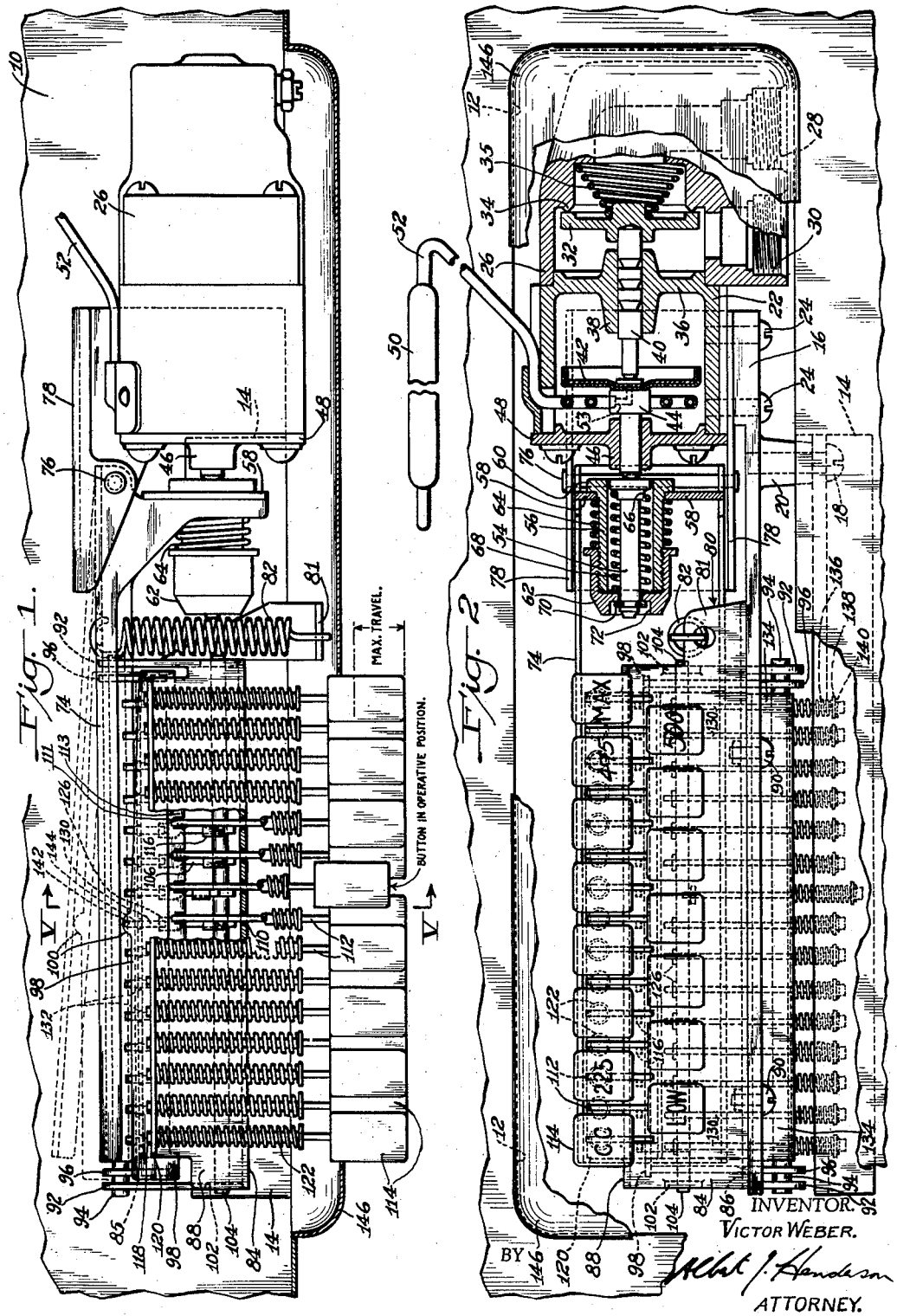
INVENTOR
VICTOR WEBER.
BY
ATTORNEY.

May 30, 1944.  V. WEBER  2,350,137
ADJUSTING MEANS FOR OVEN HEAT CONTROL
Filed Dec. 4, 1941  2 Sheets-Sheet 2
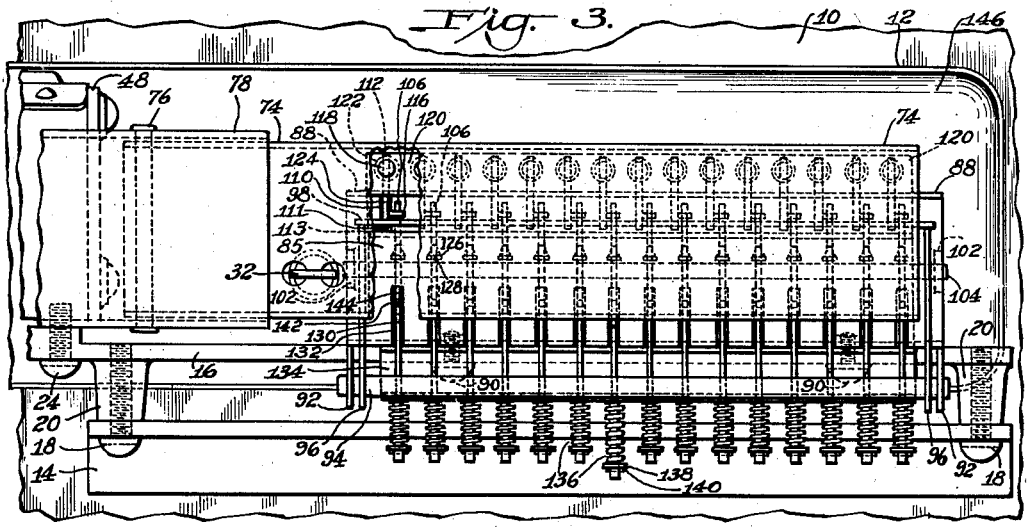
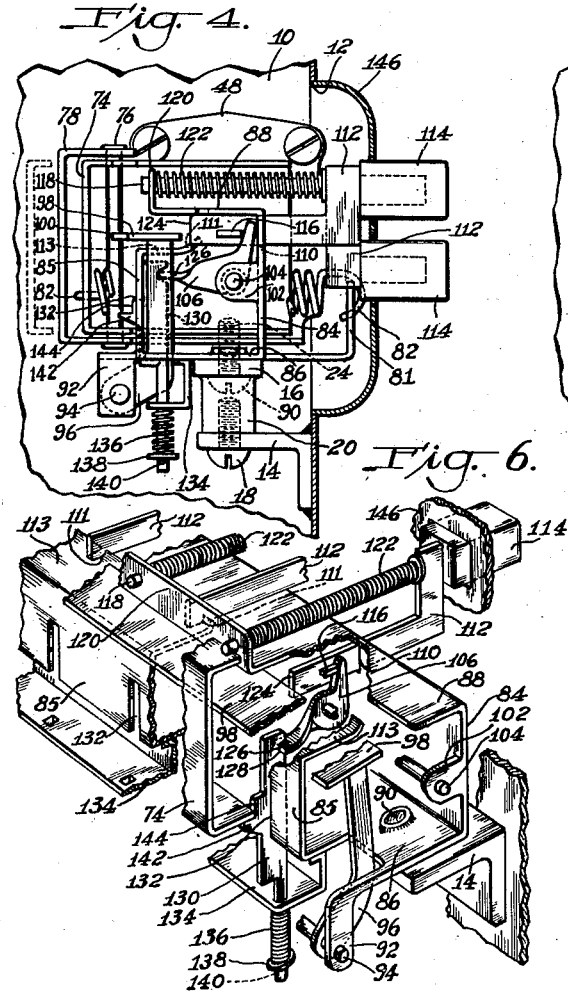
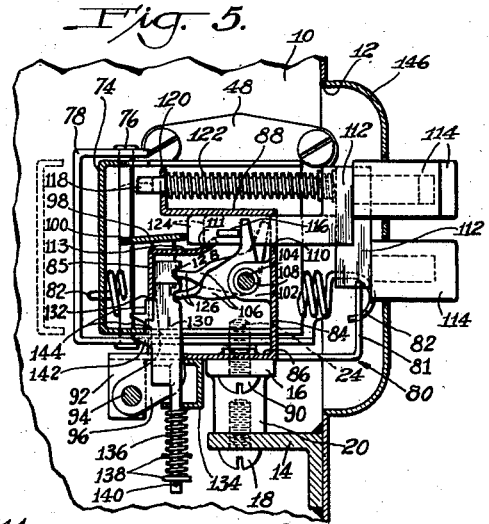
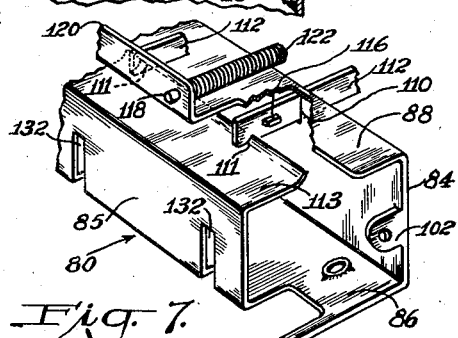
INVENTOR.
VICTOR WEBER.
BY Albert J. Henderson
ATTORNEY.

Patented May 30, 1944

2,350,137

UNITED STATES PATENT OFFICE 2,350,137

ADJUSTING MEANS FOR OVEN HEAT CONTROL

Victor Weber, Greensburg, Pa., assignor to Robertshaw Thermostat Company, Youngwood, Pa., a corporation of Pennsylvania Application December 4, 1941, Serial No. 421,631

17 Claims. (Cl. 236—99)

This invention relates to automatic means for adjusting a condition controlling device to a plurality of operative positions. It particularly relates to a manually operated mechanism for selectively setting the temperature, pressure or other condition at which a controlling device will operate.

In an exemplary embodiment of the invention the thermostat used for controlling the temperature of the oven of a domestic gas range may be adjusted to operate at any desired temperature and, for this purpose, the novel mechanism may be arranged for manual selection of one of a plurality of stations arranged in sequence on a panel. Thus, it is an object of this invention to permit the display of all the temperature settings in sequence on the front panel of the range.

Another object of the invention is to utilize a simple push motion on the part of the user to adjust the temperature at which the thermostat will operate.

Another object of the invention is to return a previously selected station automatically to inoperative position when another station is moved to operative position.

Another object of the invention is to relieve the user of the burden of adjusting the thermostat parts to different relationships to obtain different temperature settings by making the adjustment entirely automatic.

Other objects and advantages will become apparent from the following description taken in connection with the accompanying drawings, wherein:

Fig. 1 is a plan view of the device;

Fig. 2 is a front elevation but showing certain parts in section;

Fig. 3 is a partial rear elevation;

Fig. 4 is an end elevation;

Fig. 5 is a section taken on the line 5—5 of Fig. 1 looking in the direction indicated by the arrows; and Figs. 6 and 7 are perspective views of details.

Referring more particularly to the drawings, the automatic adjustment means of this invention is shown as applied to a thermostatic regulator of a domestic gas range but it will be understood that the invention is not limited to this particular application but may be used for adjusting many other condition controlling devices as will hereinafter appear. In this embodiment then, the front panel of a domestic gas range is designated by the numeral 10 and has a rectangular opening 12 extending therethrough and within the confines of which the adjusting means and oven heat control are adapted to be mounted.

Secured to the rear face of the panel 10 slightly below the bottom edge of the opening 12 is an angular support 14 upon which a base member 16 is mounted. The base member 16 may be secured in position on the support 14 by screws 18 which extend through the support 14 and through bosses 20 or other suitable spacing means carried on the base member 16.

The thermostat to which this invention is applied may comprise a hollow body member 22 secured as by the screws 24 to the base member 16 and projecting slightly beyond one end thereof. The projecting end of the body member 22 carries an end cap 26 having an inlet 28 and an outlet 30 positioned in one side thereof. Communication between the inlet 28 and the outlet 30 on the interior of the end cap 26 is controlled by a valve member 32 adapted to engage with a valve seat 34 located therebetween. A spring 35 extends between the valve member 32 and the end cap 26 to bias the valve member away from its seat.

A partition 36 extends across the interior of the body 22 at the junction of the end cap 26 therewith and is provided with a hub portion 38. A gland pin 40 is mounted for reciprocation in the hub 38 and one end projects therethrough and forms a support for the valve member 32. The opposite end of the gland pin 40 extends into engagement with a diaphragm element 42 composed of a pair of nested discs adapted to expand and contract at their center portions. The outer disc of the diaphragm 42 carries a stud 44 supported for reciprocation in the hub portion 46 of a closure cap 48 secured to the body 22 at the end thereof opposite the end cap 26.

Expansion and contraction of the diaphragm 42 is controlled by the temperature existing within the oven of the gas range within which a temperature sensitive bulb 50 is mounted. The bulb 50 is connected to the diaphragm 42 by a capillary tube 52 which extends through an opening in the body 22 and after being coiled around the stud 44 has its opposite end soldered or otherwise secured thereto in communication with a duct 53 formed in the stud 44 and communicating with an opening in the outer disc of the diaphragm 42. As is usual in such cases, the bulb element 50 is adapted to contain a temperature sensitive liquid which will expand under the influence of heat in the oven and exert pressure to move the nested discs of the diaphragm 42 apart.

The stud 44 projects through the hub 46 into engagement with a pin 54 mounted within a thimble 56 carried by a plate 58. The end of the thimble 56 adjacent the stud 44 is provided with a head 60 and the opposite end is threaded for the reception of a nut 62. The head 60 is positioned on one side of the plate 58 with the threaded end projecting therethrough, the plate 58 being fastened on the thimble 56 in any suitable manner. The plate 58 is engaged by a spring 64 extending between the nut 62 and the adjacent side of the plate 58. The pin 54 is provided with a reduced portion forming a shoulder 66 and the opposite end projects through the nut 62. Between the nut 62 and the shoulder 66 is a spring 68 serving to bias the pin 54 toward the stud 44. The projecting end of the pin 54 may be provided with movement limiting means in the form of a washer 70 fitting within a groove formed on the pin 54 and located within a recess 72 in the end of the nut 62. The washer 70 is adapted to engage with the bottom of the recess 72 and thus limit movement of the pin 54 toward the stud 44.

This invention is more particularly directed toward the provision of means for adjusting the temperature at which the thermostatic mechanism described will operate. To this end the plate 58 forms one leg of a bell-crank lever 74 which is of channel form in cross-section and has a longer leg which extends from the plate 58 to adjacent the end of the opening 12 opposite the thermostat. The bell-crank lever 74 is pivoted on a pin 76 extending between the arms of a channel-shaped support 78 which may be secured to the base member 16 by the screws 24 which also serve to secure the body member 22 of the thermostat. A bracket 81 extends upwardly from a frame 80 on the side opposite the longer leg of the bell-crank lever 74. A coil spring 82 has one end secured to the upstanding bracket 81 and the other end secured to the longer leg of the bell-crank lever 74. The spring 82 thus extends substantially parallel with the plate 58 forming one leg of the bell-crank lever 74 and serves to bias this lever on its pivot 76 in a counter-clockwise direction, as viewed in Fig. 1.

As shown best in Fig. 7, the frame 80 is of box-like form having a front piece 84, a back piece 85, a bottom side 86 and an upper side 88. The front piece 84 extends from the bracket 81 substantially parallel with the panel 10 and the bottom side 86 is secured to the base member 16 by means of the screws 90. At each end of the frame 80 the bottom side 86 thereof is provided with depending bracket portions 92 extending downwardly and rearwardly. Each depending bracket 92 is perforated for the reception of a rock-shaft 94 to which a pair of rockers 96 carried by a rocking-bar 98 are secured. The rocking-bar 98 extends substantially parallel with and adjacent to the longer leg of the bell-crank lever 74 within the channel section thereof and is provided with a projection 100 intermediate its ends which is adapted to engage with the lever 74 upon rocking movement.

The front piece 84 of the frame 80 carries a plurality of lugs 102 which may be struck up from the material of the frame or may be secured thereto by any suitable means. The lugs 102 are disposed one at either end of the front piece 84 and one in the central portion thereof and extend between the bottom side 86 and the upper side 88 substantially equidistant therefrom. A rod 104 is supported in the lugs 102 and extends from one end of the frame 80 to the other. A series of small bell-crank levers 106 are pivotally mounted on the rod 104 spaced one from the other by the provision of collars 108 therebetween. The front piece 84 of the frame 80 is further provided with a series of slots 110 adjacent one side of the small bell-crank levers 106. Mounted for reciprocation in each slot at right angles to the rod 104 is a plunger shaft 112 which projects through the opening 12 in the panel 10 and carries a selector push-button 114. Further support for the plungers 112 is provided by slots 111 formed in a flange 113 on the back piece 85 and aligned with the slots 110 in the front piece 84 (see Fig. 7).

The buttons 114 may carry indicia for various temperature settings of the thermostat with the "Low" temperature setting positioned at the left-hand end of the panel and the "Maximum" positioned at the right-hand end, as viewed in Fig. 2. If desired, a "Cold-Check" temperature setting may be provided at the extreme left-hand end of the panel, as viewed in Fig. 2, and the remaining buttons may be marked from 225° to 500° F. in units of twenty-five degrees. In this embodiment fifteen selector push buttons have been utilized but it will be understood that any desired number may be included by lengthening or shortening the associated parts.

The plunger shaft 112 of each manually movable selector assembly is L-shaped and the portion which extends through the slot 110 is provided with a lateral projection 116 adapted to engage with one leg of the adjacent small bell-crank lever 106. Extending from the other portion of the plunger shaft 112 parallel with the first portion is a pin 118 the opposite end of which is supported in an upturned flange 120 formed on the upper side 88 of the frame 80. A coil spring 122 surrounds the pin 118 and serves to bias the plunger 112 away from the rocking-bar 98. When a button 114 is operated to move a plunger 112 longitudinally of its slot 110, thus compressing spring 122, the end face 124 of the plunger 112 will move into engagement with the rocking-bar 98 and move it in counter-clockwise direction (see Figs. 4, 5 and 6).

Each small bell-crank lever 106 has, at the end opposite to that which engages the lateral projection 116, a tongue 126 which engages with a V-shaped notch 128 formed in one side of a related locking bar 130 forming part of each manually operated selector assembly.

The locking bars 130 extend between the frame 80 and the rock-shaft 94 and are supported for movement at right angles to the plungers 130 in a series of slots 132 formed in the bottom side 86 and the side 85 of the frame 80. The locking bars 130 extend downwardly through the slots 132 and are slidably supported in spaced relation by a slotted channel bar 134. The bars 130 carry coil springs 136 operative between the face of the channel bar 134 and a washer 138 positioned on the locking bars by means of a pin 140. The springs 136 tend to urge the locking bars 130 downwardly but, due to the engagement of the tongues 126 of levers 106 with the V-notches 128, such action is prevented during such time as the coil springs 122, which are stronger than springs 136, are operative.

The locking bars 130 also carry projections 142 extending from one edge thereof and having the undersides normally overlying the channel section of the lever 74. The adjacent edge of the channel section abuts the edge of the locking bars below the projections 142 when the push buttons are all in an inoperative position. Thus the lever 74 is prevented from moving any further in a counter-clockwise direction, as viewed in Fig. 1, under the influence of the coil spring 82.

When a button 114 is depressed to cause the plunger 112 associated therewith to engage the rocking-bar 98 and move it on its pivot, the lever 74 is thereupon moved away from the locking bars 130 permitting the spring 136 on the individual bar to pull the projection 142 below the edge of the channel section. When manual pressure is removed from the button 114 the bar 130 does not tend to move towards its original position until the projection 116 engages the lever 106 on the way back to the released position. The lever 74 moves across the upper face of the extension 142 into engagement with a holding portion 144 which projects from the edge of the locking bar 130 immediately above the projection 142. The holding portion 144 may extend a different distance from the edge of the locking bar 130 for each such locking bar, the difference in distance corresponding to the temperature indications on the buttons.

The opening 12 in the panel 10 is adapted to receive a closure plate 146 which may be a press fit therein and is provided with a series of openings through which the buttons 114 may project. Thus, the entire mechanism including the thermostatic control is hidden from view behind the panel and only the buttons 114 arranged in sequence and forming convenient operating stations for the control are visible.

In setting the temperature at which the control is designed to operate, the button 114 corresponding to such temperature is operated by means of a simple push motion on the part of the operator. When the manual pressure is removed such button will remain slightly depressed below the plane of the remaining buttons until another such button is depressed to change the temperature setting. Upon operation of a button in this manner, the end 124 of plunger 112 contacts the bar 98 moving it to the left as shown in Figs. 4 and 5. The projection 100 of bar 98 thereupon engages lever 74 moving this lever also to the left or in a clockwise direction, as shown in the dotted lines in Fig. 1. Clockwise movement of the lever 74 causes plate 58 and the thimble 56 secured thereto also to move in a clockwise direction. Hence, the nut 62 and the pin 54 also move to the left, as viewed in Fig. 2, and away from the stud 44. However, due to the pressure exerted by the valve spring 35 the stud 44, diaphragm 42, gland pin 40 and valve member 32 also move to the left, causing the valve to open.

Referring again to Figs. 4, 5 and 6, when the bar 112 moves to the left upon operation of a button 114, the lateral projection 116 thereon permits the small bell-crank lever 106 to be moved by the locking bar spring 136 until the extension 142 moves below the edge of the channel section of the lever 74. Release of pressure on the button 114 causes the lever 74 to move to the right, or in a counter-clockwise direction, under tension exerted by the spring 82. Simultaneously, the plunger 112 attached to button 114 also moves to the right, but before the locking bar 130 can resume its upward movement. Consequently, the edge of the channel section of lever 74 moves to a position overlying the projection 142 on the locking bar 130 and in engagement with the holding portion 144. Thus, the locking bar 130 is prevented from resuming its original position. Due to the different heights of the holding portions 144, it will be apparent that the lever 74 will be held in different positions for each button operated and thus the valve member 32 will be held in various positions away from its seat 34. Consequently, different amounts of fuel will be permitted to flow past the valve member to the inlet and different temperatures will be obtained by operation of different buttons.

When a locking bar 130 is being held in position by the edge of the channel section of lever 74, the small bell-crank lever 106 is also prevented from returning to its original position due to the engagement of its tongue 126 with the V-notch 128 formed in the locking bar 130. In turn, the small bell-crank lever 106 prevents the plunger 112 from returning to its original position due to engagement of the lateral projection 116 therewith. Consequently, the button 114 which has been operated will remain below the plane of the remaining buttons and can readily be distinguished therefrom. Operation of a different button will serve to move the lever 74 sufficiently far away from the locking bar 130 to permit the button previously operated to return to its original position under the influence of the spring 122. Hence, when another station is selected and the button operated, the previously selected station is returned automatically to inoperative position.

Upon expansion of the diaphragm when the fluid in the bulb 50 becomes heated, the inner disc of the diaphragm 42 will move to the right, as viewed in Fig. 2, serving to close the valve 32. Such action is due to the spring 35 under the valve member 32 being weaker than the spring 68 which engages the pin 54. When the temperature in the oven or other location of the bulb 50 decreases, the pressure of the liquid will be removed from the diaphragm 42 and the parts will resume their operative position with the valve member again returning to its position off its seat to admit fuel to the inlet 30.

In the position shown in Fig. 2 the valve member 32 is shown seated. This may occur after a button is operated and the oven has reached the selected temperature. Should another temperature be desired and the appropriate button be operated, then the button previously selected will return to normal position as previously explained. The holding portion 144 of the locking bar 130 corresponding to the selected station will position the lever 74 so that the valve will open either more or less than previously, depending on whether the selected temperature is higher or lower.

Provision for overshoot is made in this construction should the diaphragm expand after the valve member is seated. Upon this occurrence the outer disc of the diaphragm moves to the left as viewed in Fig. 2 carrying the stud 44 with it. The lever 74 carrying the thimble 56 is held in position by spring 82 which is stronger than spring 68 and the latter therefor compresses. The washer 70 on pin 54 is moved away from the recess 72 in the nut 62 and thus no undue pressure is placed on the valve member 32. Spring 68 will, however, return the stud 44 to its original position as soon as a button is operated and plate 58 moved in response thereto.

It will be observed that the actual thrust on the bar 98 moving the lever 74 against the tension of the coil spring 82 is exerted by the terminal ends 124 of the plungers 112. The holding portions 144 merely receive the edge of the channel section of lever 74 upon release of manual pressure on the button being actuated. Thus, any wear which occurs during use of the device will principally affect the terminal ends 124 of the plungers 112 and not the holding portions 144. As these holding portions set the position of adjustment of the thermostatic mechanism the lack of wear thereon is an important factor in maintaining accuracy over long periods of time. Provision is made for wear on the plunger ends 124 to prevent detracting from their ability to operate the bar 98 sufficiently.

I claim:

1. An automatic adjusting means for control devices having an element reciprocable toward and away from its seat, comprising adjustable means mounted in the path of said element for limiting movement of said element relative to its seat, means for adjusting said movement limiting means to different operative positions so that said element can move to positions corresponding to different control settings, a plurality of operating members each representing a different control setting and operable in common on said adjusting means for selecting said operative positions, and means effective upon operation of any one of said operating members for maintaining said movement limiting means in selected operative position coincident with return of said adjusting means and operating member toward initial position.

2. An automatic adjusting means for control devices having an element reciprocable toward and away from its seat, comprising adjustable means mounted in the path of said element for limiting movement thereof away from its seat, said means being adapted normally to maintain said element seated against spring pressure biasing it from its seat, means for adjusting said movement limiting means to different operative positions thereby causing said element to move from its seat to positions corresponding to different control settings, a plurality of operating members each representing a different control setting and operable in common on said adjusting means for selecting said operative positions, and means effective upon operation of any one of said operating members for maintaining said movement limiting means in selected operative position coincident with return of said adjusting means and operating member toward initial position.

3. An automatic adjusting means for control devices having an element reciprocable toward and away from its seat, comprising pivoted means for limiting movement of said element to positions corresponding to different control settings, yieldable means cooperating with said pivoted means normally to maintain said element seated against spring pressure biasing it from its seat, a rocking bar operative on the pivoted means for overcoming said yieldable means and adjusting said pivoted means to different operative positions, a plurality of operating members each representing a different control setting and operable in common on said bar for selecting said operative positions, and means engageable with said pivoted means upon operation of any one of said members for maintaining the selected operative position of said pivoted means.

4. An automatic adjusting means for control devices having an element reciprocable toward and away from its seat, comprising pivoted means having a portion extending transversely of the axis of reciprocation of said element for limiting movement thereof to positions corresponding to different control settings, yieldable means extending substantially parallel with said transversely extending portion and cooperating with said pivoted means normally to maintain said element seated against spring pressure biasing it from its seat, a rocking bar operative on the pivoted means for overcoming said yieldable means and adjusting said pivoted means to different operative positions, a plurality of operating members each representing a different control setting, said members being movable into and out of operative engagement with said bar in a path substantially parallel with said transversely extending portion for causing variation in the operative position of said bar and thereby of the pivoted means, and means engageable with said pivoted means upon operation of any one of said members for maintaining the selected operative position of said pivoted means.

5. An automatic adjusting means for control devices comprising a movable element for setting the operating position of the control, a rocking bar movable into engagement with said element for actuating it to different operative positions, a plurality of operating members arranged in spaced relation with respect to each other and operable in common on said bar for selecting said different operative positions, abutment means engageable with said movable element upon operation of any one of said members for positioning said element in said different operative positions, and pivoted means extending between said operating members and abutment means for engaging the latter with said movable element.

6. An automatic adjusting means for control devices comprising a movable element for setting the operating position of the control, a rocking bar movable into engagement with said element for actuating it to different operative positions, a plurality of operating members arranged in spaced relation with respect to each other and operable in common on said bar for selecting said different operative positions, abutment means engageable with said movable element upon operation of any one of said members for positioning said element in said different operative positions, pivoted means extending between said operating members and abutment means for engaging the latter with said movable element, and latching elements operable upon movement of said movable element to operative position for maintaining said abutment means in engagement therewith.

7. An automatic adjusting means for control devices comprising a movable element for setting the operating position of the control, a rocking bar movable into engagement with said element for actuating it to different operative positions, a plurality of operating members movable into and out of engagement with said bar, said members being arranged in sequence along the length of said bar and operable in common thereon for selecting said different operative positions, a locking bar associated with each operating member and movable substantially normal to the path of movement thereof into operative engagement with said movable element, said locking bar being adapted to position said movable element in selected operative position upon release of the associated operating member, and pivoted means extending between each operating member and associated locking bar for transmitting movement of one to the other.

8. An automatic adjusting means for control devices comprising a movable element for setting the operating position of the control, a rocking bar movable into engagement with said element for actuating it to different operative positions, yieldable means for biasing said movable element in a direction opposite to the effective movement of said rocking bar, manually actuable means for moving said rocking bar comprising a plunger yieldably mounted for return towards inoperative position upon cessation of manual actuation, a locking bar movable into operative engagement with said movable element for positioning said movable element in selected operative position while said plunger returns towards inoperative position, means for moving said locking bar upon actuation of said manual means, said locking bar being yieldably mounted for return towards inoperative position upon cessation of said manual actuation, and latching means operative upon actuation of said movable element to an operative position for maintaining said locking bar in engagement with said movable element and preventing return of both said locking bar and plunger to the said inoperative positions thereof.

9. An automatic adjusting means for control devices comprising an element pivoted to swing in an arcuate path for setting the operating position of the control, a rocking bar pivoted to swing in an arcuate path substantially normal to and intersecting that of said element, manually movable means reciprocable tangentially of the path of said rocking bar for actuating said rocking bar into engagement with said element for moving the latter on its pivot, means movable longitudinally into the path of said element transversely of said manually movable means for adjusting said setting, and means operable between said manually and longitudinally movable means for transmitting movement of one to the other.

10. An automatic adjusting means for control devices comprising an element pivoted to swing in an arcuate path for setting the operating position of the control, a rocking bar pivoted to swing in an arcuate path substantially normal to and intersecting that of said element, manually movable means reciprocable tangentially of the path of said rocking bar for actuating said rocking bar into engagement with said element for moving the latter on its pivot, means movable longitudinally into the path of said element transversely of said manually movable means for adjusting said setting, means operable between said manually and longitudinally movable means for transmitting movement of one to the other, and means engageable with said element upon adjustment of said setting for latching said longitudinally movable means against further movement.

11. An automatic adjusting means for control devices comprising an element pivoted to swing in an arcuate path for setting the operating position of the control, a rocking bar pivoted to swing in an arcuate path substantially normal to and intersecting that of said element, manually movable means reciprocable tangentially of the path of said rocking bar for actuating said rocking bar into engagement with said element for moving the latter on its pivot, means movable longitudinally into the path of said element transversely of said manually movable means for adjusting said setting, means operable between said manually and longitudinally movable means for transmitting movement of one to the other, means engageable with said element upon adjustment of said setting for latching said lonigtudinally movable means against further movement, and additional manually movable means operable in common with the first said means upon said rocking bar for changing the setting of said element and simultaneously releasing said latching means.

12. An automatic adjusting means for control devices having an element reciprocable toward and away from its seat, comprising a frame, a lever pivoted on said frame to swing in an arcuate path, said lever having a portion associated with said element and normally maintaining it seated against spring pressure biasing it from its seat, said lever having an actuating arm extending substantially normal to said portion and movable for setting the different operating positions of said element with respect to its seat, a rocking bar pivoted on said frame to swing in an arcuate path substantially normal to and intersecting that of said actuating arm, said bar extending substantially parallel with said arm from one end thereof to the other, a plurality of independently movable operating members carried by said frame and movable manually into and out of engagement with said bar tangentially of said arcuate path thereof, said members being arranged in sequence along the length of said bar and operable in common thereon for actuating said bar into engagement with said arm for moving the lever on its pivot, a plurality of locking bars slidably mounted in the frame one adjacent each operating member, said locking bars being adapted to maintain said lever in selected operating position, and pivoted means extending between each operating member and associated locking bar for transmitting movement of the one to the other.

13. An automatic adjusting means for control devices having an element reciprocable toward and away from its seat, comprising a plurality of independently operable manual control members spaced from said element, a rocking bar encompassing said members for operative engagement thereby, a lever pivoted at one end transversely of its longitudinal axis and engaging said bar intermediate the ends thereof, and means associated with said lever for positioning said element with respect to its seat when any one of said members is operated to adjust said lever on its pivot.

14. An automatic adjusting means for control devices having an element reciprocable toward and away from its seat, comprising a plurality of independently operable manual control members spaced from said element, a rocking bar encompassing said members for operative engagement thereby, a lever pivoted at one end transversely of its longitudinal axis and engaging said bar intermediate the ends thereof, a lateral extension on said lever extending into operative engagement with said element, said control members being operable through said bar for swinging said lever on its pivot to move said extension and position said element with respect to its seat, and latching elements operable upon swinging movement of said lever for maintaining said lever in operated position upon release of said manual control.

15. A temperature regulating device comprising in combination, a control member having a bias toward one controlling position, adjustable means having a stronger bias for operating said control member toward another controlling position, a plurality of manually operable members each representing a different temperature setting and independently movable for adjusting said means to different positions against its bias thereby causing a corresponding positioning of said control member in accordance with its bias, and means responsive to temperature changes interposed between said control member and adjustable means for overcoming the bias of said member and varying the position thereof relative to said adjustable means to maintain said temperature setting.

16. A temperature regulating device comprising in combination, a control member having a bias toward one controlling position, a pivoted lever having a stronger bias for operating said control member toward another controlling position, a plurality of manually operable members each representing a different temperature setting and independently movable for adjusting said lever to different positions against its bias thereby causing a corresponding positioning of said control member in accordance with its bias, and a thermostatic element interposed between said control member and lever and responsive to temperature changes for overcoming the bias of said member and varying the position thereof relative to said lever to maintain said temperature setting.

17. A temperature regulating device comprising in combination, a valve seat, a valve member cooperable with said seat and having a bias away from its seat, a thermally expansive and contractive element movable with said valve member under said bias, a pivoted lever mounted in the path of said thermal element and having a stronger bias for moving said valve member toward its seat while causing corresponding movement of said thermal element, a plurality of manually operable members each representing a different temperature setting and independently movable for adjusting said lever to different positions against its bias, said valve member thereby moving under its bias into different relative positions with its seat, and means connected with said thermal element and responsive to temperature changes for causing expansive and contractive movement thereof to vary the position of said valve member relative to its seat and maintain said temperature setting.

VICTOR WEBER.